United States Patent
Chemshit et al.

(10) Patent No.: US 11,819,774 B2
(45) Date of Patent: Nov. 21, 2023

(54) MODEL CONSTRUCTION SET

(71) Applicants: Ilya Vladimirovich Chemshit, Yaroslavl' (RU); Aleksej Gennadevich Pautov, Yaroslavl' (RU)

(72) Inventors: Ilya Vladimirovich Chemshit, Yaroslavl' (RU); Aleksej Gennadevich Pautov, Yaroslavl' (RU)

(*) Notice: Subject to any disclaimer, the term of this patent is extended or adjusted under 35 U.S.C. 154(b) by 60 days.

(21) Appl. No.: 17/290,856

(22) PCT Filed: Aug. 2, 2019

(86) PCT No.: PCT/RU2019/050124
§ 371 (c)(1),
(2) Date: May 3, 2021

(87) PCT Pub. No.: WO2020/096494
PCT Pub. Date: May 14, 2020

(65) Prior Publication Data
US 2021/0370193 A1 Dec. 2, 2021

(30) Foreign Application Priority Data
Nov. 6, 2018 (RU) .......................... RU2018139411

(51) Int. Cl.
*A63H 33/10* (2006.01)
(52) U.S. Cl.
CPC ......... *A63H 33/108* (2013.01); *A63H 33/107* (2013.01)
(58) Field of Classification Search
CPC ...... A63H 33/04; A63H 33/10; A63H 33/103; A63H 33/107; A63H 33/108
(Continued)

(56) References Cited

U.S. PATENT DOCUMENTS 3,033,598 A * 5/1962 Polgar .................... F16B 12/00
    403/178
3,429,093 A * 2/1969 Hufgard ................... E04B 1/58
    52/655.1
(Continued)

FOREIGN PATENT DOCUMENTS

CN     104912880     9/2015
FR     2 891 030     3/2007
(Continued)

OTHER PUBLICATIONS

International Search Report for PCT/RU2019/050124 dated Dec. 19, 2019, 2 pages.

*Primary Examiner* — Alexander R Niconovich
(74) *Attorney, Agent, or Firm* — Nixon & Vanderhye PC (57) ABSTRACT

A construction set for erecting structures that can be assembled and disassembled. Functional capabilities of a construction set are expanded, which makes it possible to assemble a high-strength structure. Blocks with a square cross-section having faces of different widths and lengths, identical circular apertures, and an internal longitudinal passage are provided, for connection in a longitudinal and a transverse direction to form angles that are rigidly and movably connected. The blocks are made of square tubing of compatible standard sizes. Auxiliary parts are produced by cutting away an end face of a block, making it possible to use the blocks as pivotable levers and to use a unified fastening connective element as a pivot pin, where the position of one of the blocks changes along spherical coordinates relative to the conjugation point.

15 Claims, 5 Drawing Sheets

(58) Field of Classification Search
USPC .................. 446/85, 120, 121, 122, 123, 124
See application file for complete search history.

(56) References Cited

U.S. PATENT DOCUMENTS

| | | | | |
|---|---|---|---|---|
| 3,604,146 | A * | 9/1971 | Winer | A63H 33/108 446/122 |
| 3,651,769 | A * | 3/1972 | Foley | B65D 19/0073 108/52.1 |
| 3,854,237 | A * | 12/1974 | Loth | A63H 33/108 446/122 |
| 4,547,160 | A * | 10/1985 | Labelle | G09B 1/40 446/107 |
| 4,642,063 | A * | 2/1987 | Gillette | A63H 33/108 446/94 |
| 7,955,156 | B2 * | 6/2011 | Toht | A63H 33/046 446/92 |
| 8,382,548 | B2 * | 2/2013 | Maggiore | A63H 33/04 446/124 |
| 10,058,792 | B2 * | 8/2018 | Slepov | A63H 33/12 |
| 10,272,353 | B2 * | 4/2019 | Oh | B62B 3/008 |
| 10,518,193 | B2 * | 12/2019 | You | A63H 33/107 |
| 10,888,797 | B2 * | 1/2021 | De Wilde | F16B 12/26 |
| 11,090,575 | B2 * | 8/2021 | Landau | A63H 33/107 |
| 11,202,969 | B2 * | 12/2021 | Kaye | A63H 33/108 |
| 2004/0077256 | A1 * | 4/2004 | Laferrera | A63H 33/107 446/85 |
| 2007/0209314 | A1 * | 9/2007 | Vaughn | E04B 1/24 52/838 |
| 2007/0261356 | A1 * | 11/2007 | Vaughn | E02D 27/34 52/655.1 |
| 2008/0200091 | A1 * | 8/2008 | Blaivas | A63H 33/12 446/122 |
| 2008/0203262 | A1 * | 8/2008 | Sparks | F16B 7/18 248/346.01 |
| 2014/0273712 | A1 * | 9/2014 | Uttley | A63H 33/102 446/121 |
| 2017/0362811 | A1 * | 12/2017 | King, Jr. | F16B 12/40 |
| 2018/0021689 | A1 * | 1/2018 | Cochella | A63H 33/101 446/124 |
| 2018/0256999 | A1 * | 9/2018 | Gupta | A63H 33/108 |
| 2020/0054958 | A1 * | 2/2020 | Gallagher | A63H 33/101 |

FOREIGN PATENT DOCUMENTS

| | | |
|---|---|---|
| GB | 1143477 | 2/1969 |
| GB | 2 393 136 | 3/2004 |
| WO | 2012/078107 | 6/2012 |
| WO | 2018/080619 | 5/2018 |

* cited by examiner

MODEL CONSTRUCTION SET

This application is the U.S. national phase of International Application No. PCT/RU2019/050124 filed Aug. 2, 2019 which designated the U.S. and claims priority to RU Patent Application No. 2018139411 filed Nov. 6, 2018, the entire contents of each of which are hereby incorporated by reference.

FIELD OF THE INVENTION

The invention relates to a construction set for erecting structures that can be assembled and disassembled, applicable in construction, furniture, tourism, or toy industries to erect scaffolding or various architectural elements; to assembly frames or cases for machines or mechanisms; to manufacture diverse equipment, construction or engineering structures, furniture including camping one; to equip game places for gamers; to make toy construction sets, etc.

BACKGROUND OF THE INVENTION

A technical solution is known from the prior art as disclosed in the patent for invention FR 2891030 (A1), TIESSE PATRICK JEAN BERNARD [FR], F16B12/00; F16B7/00; F16B7/18; A47B3/06; A47B47/00; A47C4/02; A63H33/10, publ. Mar. 23, 2007, which provides a scalable self-locking assembly device, not limited to any one material and designed to make a scalable three-dimensional structure without gluing, welding, lacing, doweling, or notching, wherein the device is assembled from a construction set comprising at least three parts, all parts having identical square cross-sections; each part having at least four through holes with axes perpendicular to the side faces of the part and transversal to the longitudinal axis of the part; distances between centers of the holes being equal to length of the end face side of the part; longitudinal axis of each part being parallel to the side faces and intersecting both diagonals of end faces of the part; and the parts are connected to each other face against face by inserting at least three connecting elements into the holes. The common features that coincide with the essential features of the claimed invention comprise the following: an assembly device for making a scalable three-dimensional structure without gluing, welding, lacing, doweling, or notching; a construction set comprising parts with square cross-sections and through holes with axes perpendicular to the side faces of the part and transversal to the longitudinal axis of the part; longitudinal axis of each part is parallel to the side faces of the part; the parts are connected to each other face against face by inserting connecting elements into the holes.

Once more technical solution is known from the prior art as disclosed in the patent for invention GB 2393136 (A), WARNER TIMOTHY JOHN [GB], A63H33/10; A63H33/12; A63H33/04; A63H33/108; A63H33/12, publ. Mar. 24, 2004, which provides a toy construction set of parts comprising a plurality of construction blocks of various lengths and shapes and a plurality of pins for connecting the blocks to each other and to other elements, basic blocks of the construction set being cubical in shape; all larger blocks being solid combinations of integer numbers of the basic cubical blocks so that the length of each larger block is equal to an integer number of lengths of the basic cubical block side while the cross-sections of all larger blocks are identical and equal to square face of the base cube block; correspondingly, each larger block consisting of K elements, where K is the number of cubic blocks that will constitute the longer length of the larger block when stacked next to each other; each cubic block having one hole in the center of each its pin receiving face, each of other blocks having one hole in the center of each pin receiving end face, and all pin receiving holes having the same size; in addition, longer blocks having K equally spaced pin receiving holes on one side surface and K−1 holes on an adjacent side surface. The common features that coincide with the essential features of the claimed invention comprise the following: a construction set of parts comprising a plurality of construction blocks of various lengths and a plurality of connecting elements for connecting the blocks to each other and to other elements; basic blocks of the construction set being cubical in shape; larger blocks with lengths equal to an integer number of lengths (or widths) of the basic cubical block side; square cross section of all blocks; pin receiving holes in faces of all blocks; the same size of all pin receiving holes; presence of K pin receiving holes in one block side surface and K−1 holes on an adjacent block side surface.

The closest prior art to the claimed invention is the technical solution disclosed in the patent for invention GB 1143477 (A), HUFGARD ALBERT, A63H33/10, publ. Feb. 19, 1969, which discloses an apparatus for use in the erection of frameworks comprising elongated elements of at least three different cross-sectional sizes, such elements being designed to be plugged together lengthwise or transversely, each element having square cross-section, at least each element different in size from the size of the smallest cross-section having a passage extending through it in the longitudinal direction, each element different in size from the size of the largest cross-section elements having size corresponding to the size of said longitudinal passage in the element with a subsequent large cross-sectional size, at least each element different in size from the size of the smallest cross-section being formed with a plurality of substantially square apertures in its side walls, said apertures being arranged in pairs in said side walls in such way that each pair of apertures formed in a first pair of opposed side walls are aligned with each other and are longitudinally staggered with respect to the adjacent pair of apertures formed in the other pair of opposed side walls, each of said apertures in the side walls of each element corresponding in its cross-sectional size to the said longitudinal passage through said element, the longitudinally adjacent edges of successive pairs of apertures arranged in staggered relationship as aforesaid laying in a common plane perpendicular to the longitudinal axis of said element, and at least the element of the largest cross-sectional size being formed with a plurality of further apertures in its side walls, smaller than those apertures already mentioned, for the insertion of smaller ones of said elements or of members such as fixing pins and connecting and joint elements, said further apertures and the first-mentioned apertures being arranged in alternate sequence in said side walls of said element. The common features that coincide with the essential features of the claimed invention comprise the following: an apparatus for use in the erection of frameworks comprising elongated elements of different cross-sectional sizes, such elements being designed to be plugged together lengthwise or transversely, each element having square cross-section; each element having a passage extending through it in the longitudinal direction; each element different in size from the size of the largest cross-section elements having size corresponding to the size of said longitudinal passage in the element with a subsequent large cross-sectional size; each element being formed with a plurality of substantially square apertures in its side walls, said apertures being arranged in pairs in said side walls in such way that each pair of apertures formed in a first pair of opposed side walls are aligned with each other and are longitudinally staggered with respect to the adjacent pair of apertures formed in the other pair of opposed side walls; elements are formed with a plurality of apertures in its side walls for the insertion of members such as fixing pins and connecting elements.

A technical problem that stays unsolved at implementing above technical solutions consists in the limited number of ways to join the structural elements (blocks) due to inability of above described assembly devices to form various types of corner joints at angles other than 90°. In particular, the device disclosed in patent FR 2891030 provides only one type of block connection at an acute angle, formed when the blocks are overlapped. In the device disclosed in GB 1143477, blocks with bevel end faces are used to form various corner joints (except for joints at angle of 90°), the bevel angle having a limited set of values. In the device for erecting frameworks disclosed in the patent GB 1143477, blocks can be connected to each other at any angle in the range from 0° to 180° provided that either both blocks are positioned in one plane, which becomes the angle variation plane, or one block is positioned perpendicular to the angle variation plane, while the other block lays in said plane. The design of the claimed model construction set enables to form a wide variety of corner joints of blocks (the angle can vary from 0° to) 180°, regardless of relative positions of mating blocks.

DISCLOSURE OF THE INVENTION

The object provided by the invention is the functionality expansion of model construction set to enable assembling a variety of high-strength structures by using the model construction set that comprises blocks of square cross-section having rectangular faces of different widths designed for connection in both longitudinal and transverse directions; each block has an inner longitudinal passage, the outer size of cross-section of a block with the smaller face width corresponding to the size of cross-section of the inner longitudinal passage in a block with the larger face width, thereby enabling to insert blocks into one another; a plurality of holes being made on faces of the blocks; all holes in blocks being round in shape and identical in size; the model construction set additionally comprises auxiliary parts designed for connection with each other, one auxiliary part being made in the shape of a hollow cube with holes on four faces, three of said holes having shapes and sizes coinciding with shapes and sizes of the holes made in blocks, and the fourth hole having a larger size, centers of all four holes laying in one plane, the another auxiliary part being made in the shape of fragment of a block with a given length including the end part of the block with cutouts made in two opposite faces and rounded edges of two other opposite faces; said different auxiliary parts ensure connection of blocks such that position of a mating block capable to rotate around a junction point located on the mating face of another block is determined by spherical coordinates at any point on the surface of the hemisphere bounded by the plane of the mating face, radius of the hemisphere being equal to the length of the first block.

All blocks can be made of a square shaped pipes with dimensions of block face widths corresponding to two or more adjacent values of standard outer dimensions within the size range of square shaped pipes. Holes on faces of a block (or blocks) are longitudinally staggered so that pairs of coaxial holes located on two opposite faces longitudinally alternate with adjacent pairs of coaxial holes located on two other opposite faces of the block, while the holes in both end parts of the block (blocks) are located on all its faces in such a way that their centers lay in one plane perpendicular to the longitudinal axis of the block, distances between centers of the holes located on the blocks being a multiple of the face width of the block adopted as basic one.

Connections are secured by standard fasteners such as bolts, screws, nuts, washers, studs, etc.

Connection of blocks formed by two auxiliary parts of different types, as well as connection of blocks formed by a single auxiliary part of any type, can be movable.

The cross-sectional size of auxiliary parts is determined by the cross-sectional size of the blocks they connect.

The functionality expansion of model construction set enabling to assembly various high-strength structures is provided by:
  round shape and identical size of holes making it easy to align the holes when forming any block connections including those at angles other than 90°;
  availability of auxiliary parts in the model construction set designed for connection with each other, one auxiliary part being made in the shape of a hollow cube with holes on four faces, three of said holes having shapes and sizes coinciding with shapes and sizes of the holes made in blocks, and the fourth hole having a larger size, centers of all four holes laying in one plane, the another auxiliary part being made in the shape of fragment of a block with a given length including the end part of the block with cutouts made in two opposite faces and rounded edges of two other opposite faces; said different auxiliary parts ensure connection of blocks such that position of a mating block capable to rotate around a junction point located on the mating face of another block is determined by spherical coordinates at any point on the surface of the hemisphere bounded by the plane of the mating face, radius of the hemisphere being equal to the length of the first block.

BRIEF DESCRIPTION OF DRAWINGS

The invention is illustrated by drawings, where.

The following item numbers are used in the figures:
  1—block,
  2—side face of the block (with odd number of holes),
  3—side face of the block (with even number of holes), 4—longitudinal passage inside a block,
5—holes,
6—end part of a block,
7—end edge,
8—longitudinal axis of the block,
9—auxiliary part in the shape of cube,
10—a large hole in the auxiliary part 9,
11—auxiliary part,
12—cutouts,
13—rounded edges.

EMBODIMENT OF THE INVENTION

Figure 1:
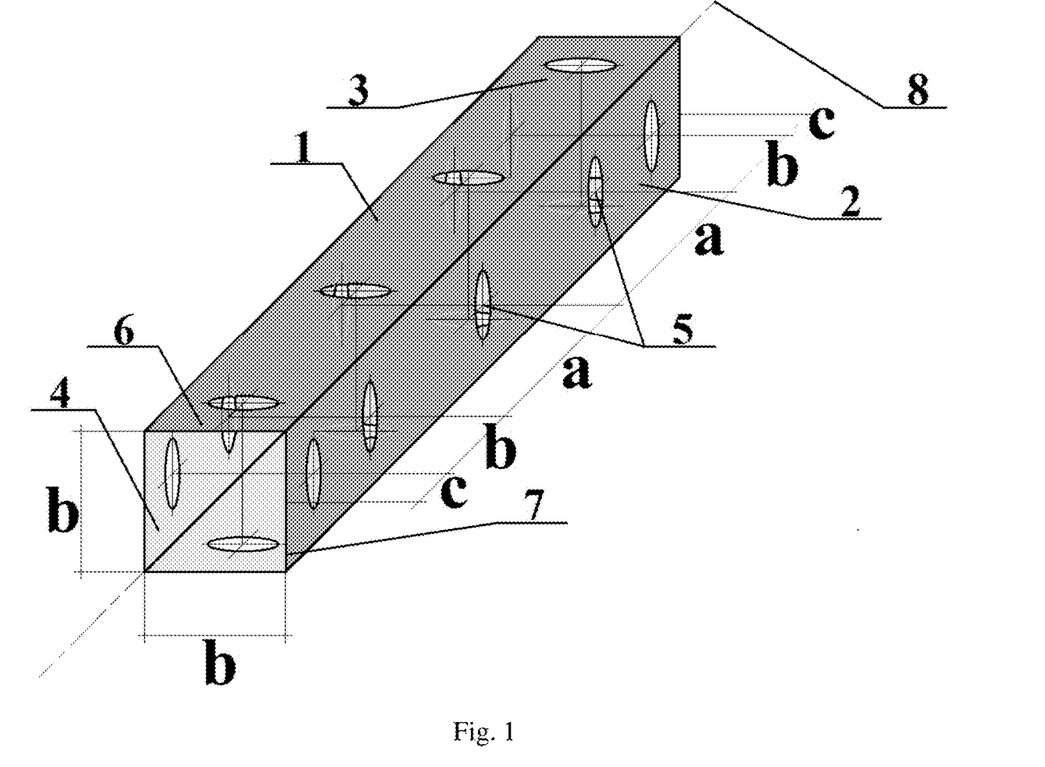
FIG. 1 shows a general view of a block having a basic size (axonometric projection)
Figure 2:
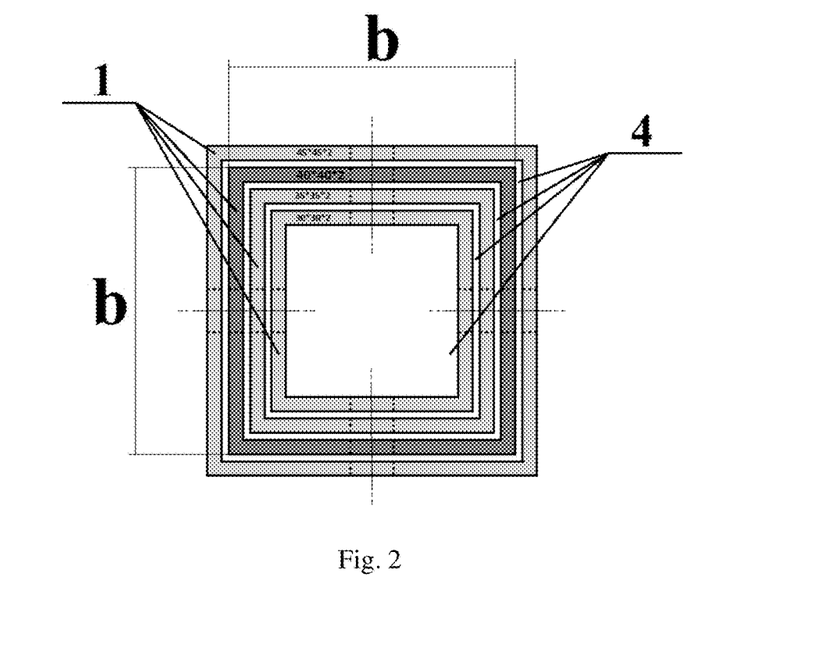
FIG. 2 shows a cross-sectional view of blocks inserted into one another (section)
Figure 3:
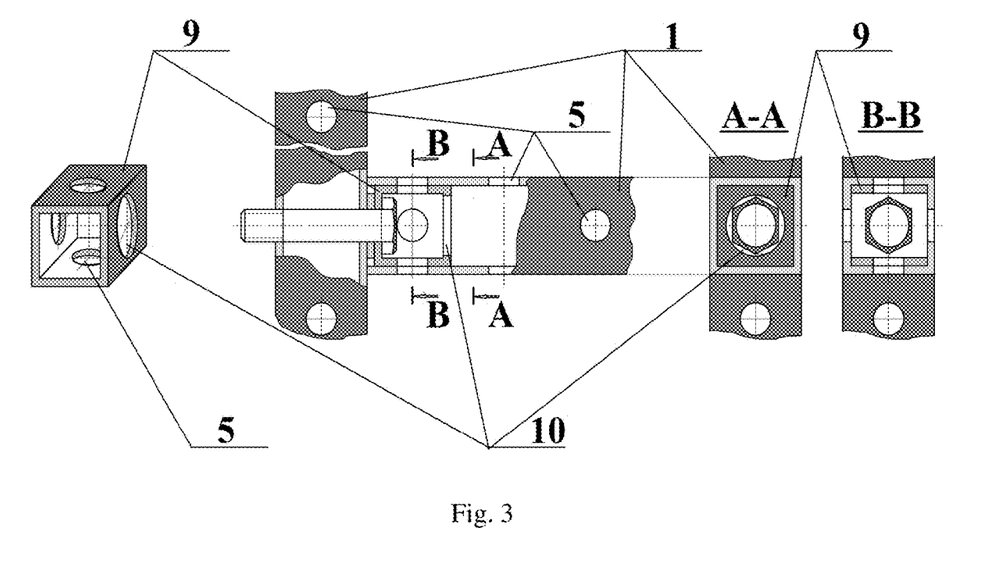
FIG. 3 shows a view of the auxiliary part in the shape of cube and scheme of fastening of this part (axonometric projection; section)
Figure 4:
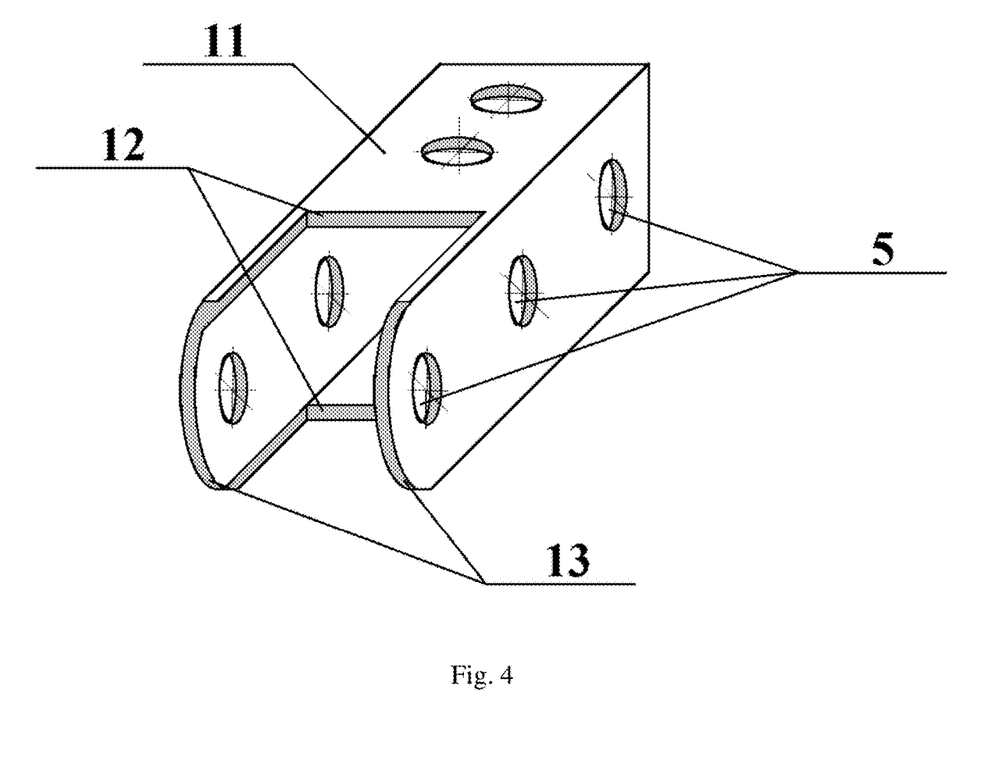
FIG. 4 shows a general view of the auxiliary part in the shape of a block fragment (axonometric projection)

The model construction set comprises a plurality of blocks 1 with a square cross-section, rectangular side faces 2, 3 and an inner longitudinal passage 4. All blocks 1 are made of a square shaped pipes so that widths of block faces (equal to lengths of square cross-section sides) correspond to two or more adjacent values of standard outer dimensions within the size range of square shaped pipes. One of selected block face widths is adopted as the basic dimension ("b" in FIG. 2). A plurality of identical round holes 5 are made on faces of all blocks 1 longitudinally staggered so that pairs of coaxial holes located on two opposite faces longitudinally alternate with pairs of coaxial holes located on two other opposite faces of the block in such manner that an odd number of holes is formed on one side face 2 and an even number of holes is formed on the adjacent side face 3. Holes 5 in end parts 6 of each block 1 are located on all its faces in such a way that their centers lay in one plane perpendicular to the longitudinal axis 8 of the block 1. Distances between centers of holes 5 is a multiple of basic dimension, namely, distances between centers of holes 5 designated as "a" in FIG. 1 is equal to two basic dimensions; distance between centers of holes 5 located in the end part 6 of the block 1 and centers of holes adjacent to them and located on faces with an odd number of holes 2 ("b" in FIG. 2) is equal to the basic dimension, distances from centers of holes 5 located in the end part 6 of the block 1 to the end edge 7 of the block 1 ("c" in FIG. 1) is equal to half the basic dimension. The model construction set additionally comprises the auxiliary part 9 designed in the shape of a hollow cube with holes 5 on four faces, three of said holes having shapes and sizes coinciding with shapes and sizes of the holes 5 made in blocks, and the fourth hole 10 having a larger size, centers of all four holes laying in one plane, and another auxiliary part 11 designed in the shape of fragment of a block with a given length including the end part of the block 6 with cutouts 12 made in two opposite faces and rounded edges 13 of two other opposite faces.

Figure 5:
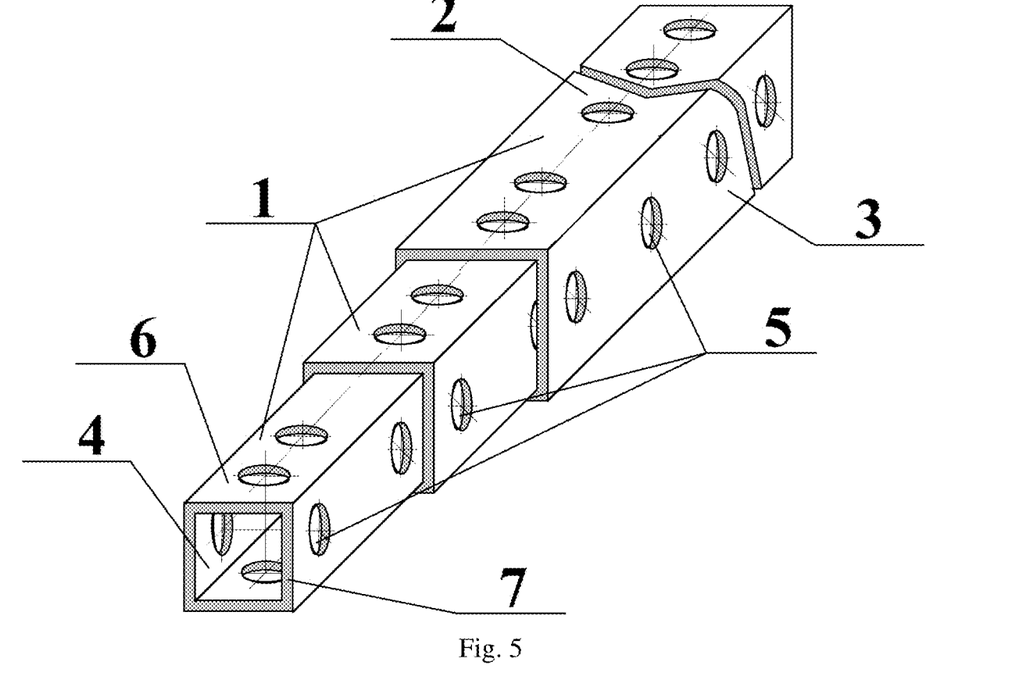
FIG. 5 shows a view of longitudinal connection of blocks one into another (axonometric projection)
Figure 6:
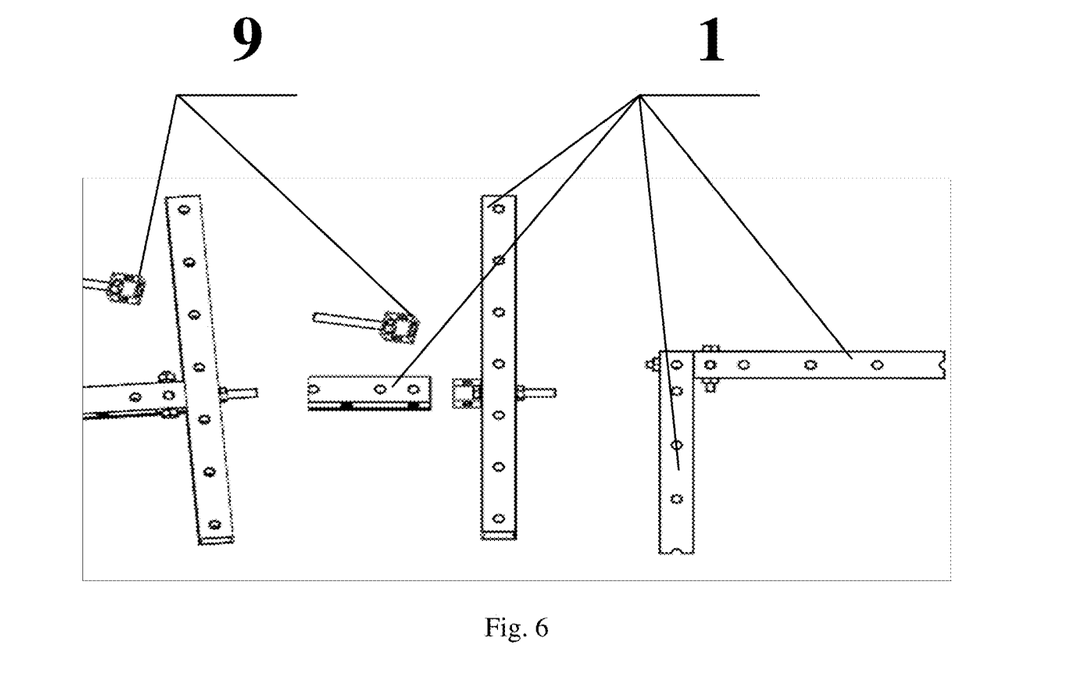
FIG. 6 shows types of T-shaped and L-shaped butt connection of blocks (photo)
Figure 7:
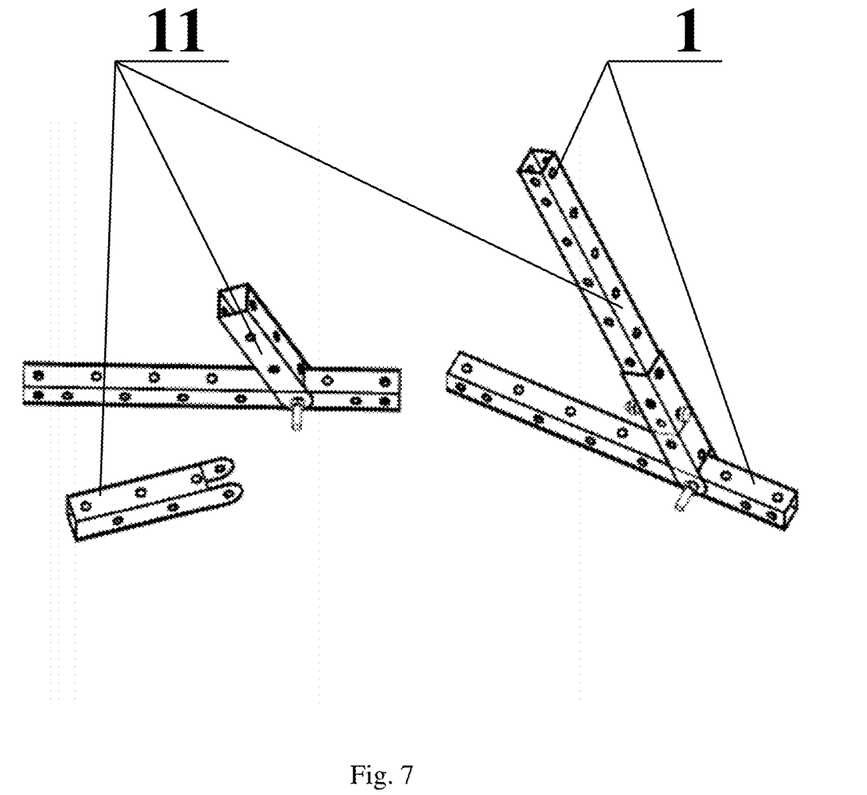
FIG. 7 shows a view of in-plane angle connection of blocks (at any angle from 0° to 180°) (photo)
Figure 8:
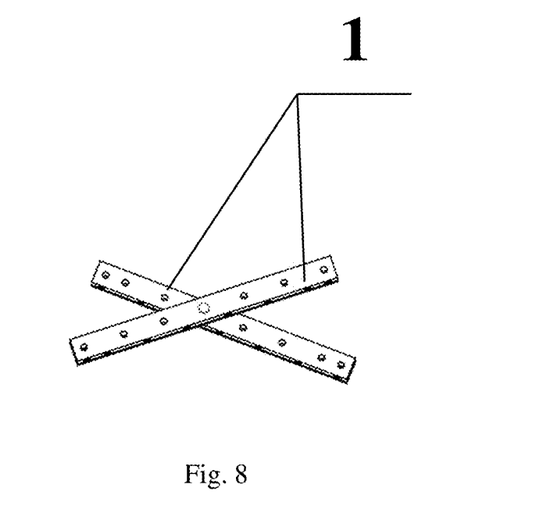
FIG. 8 shows a view of overlapping angle connection of blocks (at any angle from 0° to 90°) (photo)
Figure 9:
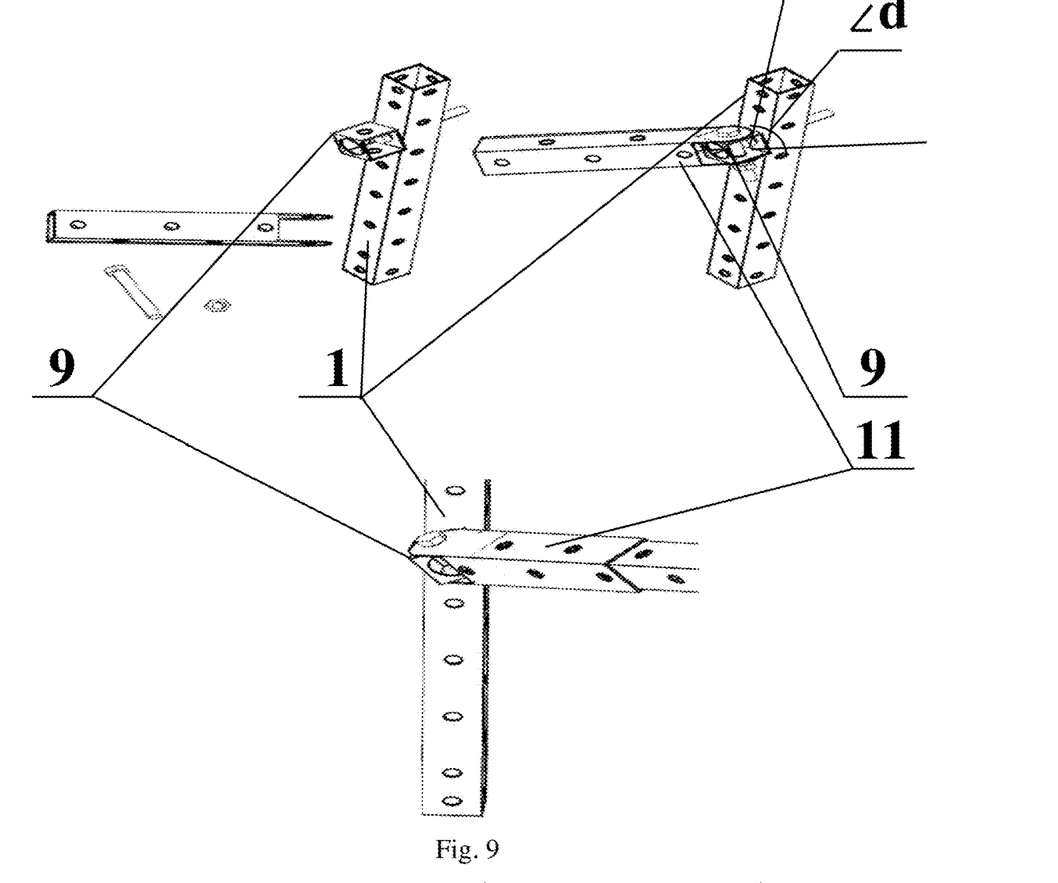
FIG. 9 shows a view of block connection using two different types of auxiliary parts (photo)
Figure 10:
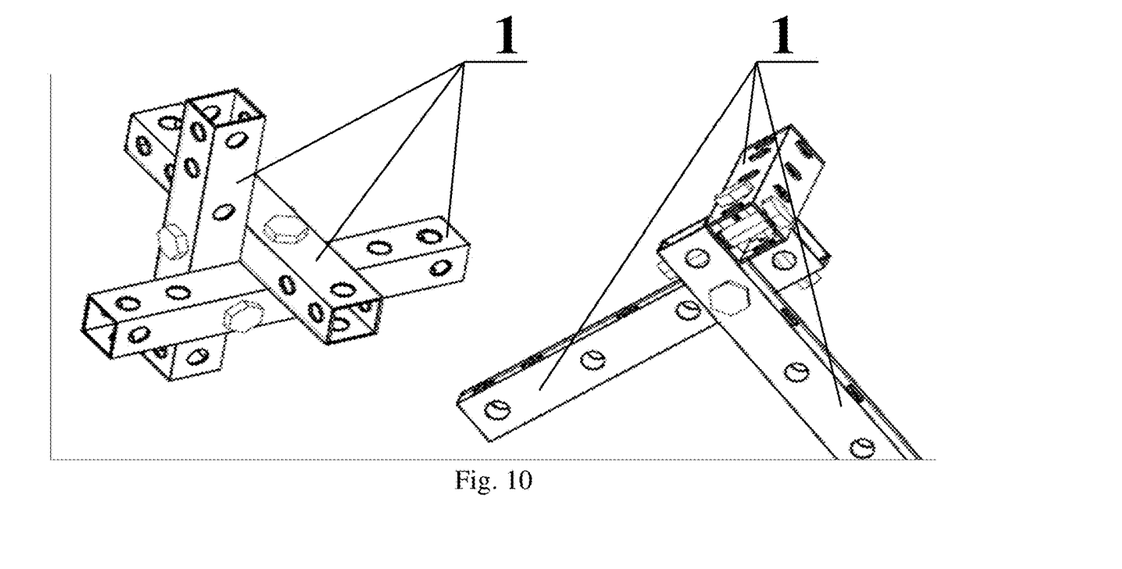
FIG. 10 shows views of orthogonal and angle connections of three intersecting blocks (photo).

The model construction set provides for various types of block connections, namely:
by inserting blocks one into the other in the longitudinal direction (FIG. 5); T-shaped and/or L-shaped butt connection of blocks using an auxiliary part 9, the connection can be made movable (FIG. 6); connection of blocks using an auxiliary part 11, the connection can be made movable (FIG. 7); overlapping angle connection of blocks (at any angle from 0° to 90°) in two parallel planes, the connection can be made movable (FIG. 8); connection of blocks by means of interconnected auxiliary part 9 and auxiliary part 11, the connection can be made movable (FIG. 9); orthogonal or angle connection of three intersecting blocks (FIG. 10).

Connections are secured by standard fasteners such as bolts, screws, nuts, washers, studs, etc.

Length of any of blocks 1 is multiple of the basic dimension.

Below is presented a preferred embodiment of the model construction set.

Depending on functional purpose of the structure being created, face width of blocks 1 is selected from among adjacent values of standard outer dimensions within the size range of finished square shaped pipes. To design the model construction set, it is enough to choose two sizes, but most often a combination of three sizes is used, for example, square shaped pipes 35 mm, 40 mm, and 45 mm in size with the wall thickness 2 mm. One of the sizes, for example, 40 mm, is adopted as the basic dimension. Length of any of blocks 1 can be chosen arbitrarily, but must always be a multiple of the basic dimension, for example, 1960 mm, 1000 mm, or 520 mm.

Finished shaped pipes have an internal cavity that forms the longitudinal passage 4 in blocks 1 made of shaped pipes. Identical round holes 5 are drilled on the side faces of blocks 1. The diameter of the holes can be chosen arbitrarily; for example, for basic dimension of 40 mm it can be adopted equal to 12 mm.

Arrangement of the holes on the blocks corresponds to longitudinal alternation with pairs of coaxial holes located on two other opposite faces of the block in such manner that an odd number of holes 5 is formed on one side face 2 and an even number of holes 5 is formed on the adjacent side face 3. Holes in end parts 6 of each block 1 are drilled on all its faces in such a way that their centers lay in one plane perpendicular to the longitudinal axis 8 of the block 1. Distances between centers of holes 5 is equal to two basic dimensions; distance between centers of holes 5 located in the end part 6 of the block 1 and centers of holes adjacent to them and located on faces with an odd number of holes 2 is equal to the basic dimension; distances from centers of holes 5 located in the end part 6 of the block 1 to the end edge 7 of the block 1 is equal to half the basic dimension.

When distances between centers of holes on the blocks are multiples of the basic dimension, it easy to align the holes 5 even at mating blocks in a variety of their relative positions as well as at various edge widths, with the possibility of strongly securing the joints obtained in such cases.

To assembly long structures, the blocks are inserted into one another, which enables to precisely align all holes 5 in overlapping faces of blocks with the same number of holes (either faces 2 or faces 3) and secure connection of the blocks at any selected location of the holes 5.

To enhance bending strength of blocks, the blocks are inserted one into another with longitudinally shifting them relative to each other or faces with an odd number of holes 2 are aligned with faces with an even number of holes 3 to form a solid block surface.

Longitudinal connection of blocks by inserting one block into another is made when the outer cross-sectional size of the block with smaller edge width corresponds to cross-sectional size of the inner longitudinal passage in the block with larger edge width.

To form a rigid T-shaped and/or L-shaped butt connection of blocks, the auxiliary part 9 is used. The auxiliary part 9 can be manufactured by cutting off end part 6 of the block 1 having the smallest edge width, for example, 35 mm. One of the four holes 5 on the auxiliary part 9 is enlarged to allow the bolt head to be inserted into inner space of the auxiliary part 9 by introducing the bolt body through the enlarged hole 10 with the thread directed outward.

To form diagonal ties (braces, etc.) between long blocks, provided that all blocks to be connected are located in one plane parallel to the faces of the blocks, it is enough to connect the blocks using a single auxiliary part 11. The auxiliary part 11 can be manufactured by cutting off a fragment of block 1 with its end part 6, the block 1 having the largest edge width, for example, 45 mm. Cutouts 12 are made in any two opposite faces of end part 6 of the cut fragment of the block 1 while edges 13 of the other two opposite edges are made rounded. Depth of the cutouts 12 is determined by the mating angle between blocks, the sharper angle is required, the deeper cutouts 12 are made.

To form a connection of blocks with the ability to change position of one (first) of the mating blocks by rotating it relative to the junction point located on the mating face of the other (second) block, the auxiliary part 9 is attached to the face of the first of the mating blocks 1. The mating face of part 9 is the face opposite to the face containing the larger hole 10. The angle between the axial line of the mating face of the part 9 and the axial line of the mating face of the first block 1 ("d" in FIG. 9) can be any within the range from 0° to 360°. Then, the auxiliary part 11 is attached and secured to the part 9; at that the angle between the longitudinal axial line of the part 11 and the line passing through the junction point of the part 9 perpendicularly to the mating face of the first block can vary from 0° to 90°.

The overlapping connection of blocks as well as connection formed by the interconnected auxiliary part 9 and the auxiliary part 11 and connection of blocks by means of a single auxiliary part can be made movable, which makes it possible to use the blocks as hinge levers, and the fastening connecting element as the hinge axis.

The cross-sectional size of auxiliary parts 9 and 11 is determined by the cross-sectional size of the blocks they connect.

The claimed model construction set allows to assemble any convenient model of a framework as well as make any necessary changes and improvements in it. The model construction set is also designed for connection with other elements that are not part of the construction set; in particular, any user-friendly seats (for example, car seats), various consumer electronics (computers, playstations, TVs, etc.) can be installed on the framework or frames assembled from the claimed model construction set.

The invention claimed is:

1. A model construction set, comprising:
   a plurality of blocks of square cross-section with rectangular faces of different widths designed for connection in both longitudinal and transverse directions, each block of the plurality of blocks having an inner longitudinal passage, an outer size of cross-section of a block with a smaller face width corresponding to a size of cross-section of the inner longitudinal passage in a block with a larger face width, so as to enable insertion of blocks into one another;
   a plurality of holes made on faces of the blocks, all of the holes in the blocks being round in shape and identical in size; and
   a first auxiliary part being made in a hollow cube shape consisting of four faces facing two-by-two, wherein in each face of said four faces is respectively positioned a hole, three of these holes having a shape and size coinciding with a shape and size of the holes made in the blocks, and a fourth of these holes having a size larger than the size of the holes made in the blocks, centers of each of all four holes laying in one plane, an axis of the centers intersecting in a single point,
   a second auxiliary part being made by cutting off an end part of a fragment of a block of the plurality of blocks so as to obtain cutouts in two opposite faces of the end part of the cut fragment of the blocks, the end part of the other two opposite faces having rounded edges;
   wherein the model construction set is mountable in a plurality of different configurations including at least one of:
   (a) insertion of the blocks into one another along the longitudinal direction so as to assemble long structures, wherein the holes in overlapping faces of the blocks are aligned and secured;
   (b) a T shaped and/or L-shaped butt connection of the plurality of blocks using the first auxiliary part, wherein the first auxiliary part is secured to the blocks by a bolt, the head of the bolt being inserted into the inner space of the first auxiliary part through the fourth hole;
   (c) connection of the plurality of blocks using the second auxiliary part, wherein a depth of the cutouts is determined by a mating angle formed between the block and the second auxiliary part;
   (d) overlapping the plurality of blocks in two parallel planes and connecting the blocks at an angle;
   (e) connection of the plurality of blocks using both the first auxiliary part and the second auxiliary part, wherein the first auxiliary part is attached to a face of a first block, the first auxiliary part having a mating face that is the face opposite to the face containing the fourth hole, where an angle measured between an axial line of the mating face of the first auxiliary part and a longitudinal axis of the first block is within a range of 0-360 degrees, the second auxiliary part being attached and secured to the first auxiliary part at another angle within a range of 0-90 degrees measured between a longitudinal axial line of the second auxiliary part and a line passing through the auxiliary part perpendicular to the face of the first block; and
   (f) connection of at least three blocks intersecting in different planes along the longitudinal axis form a rigid connection;
   wherein the connections in (a)-(f) are securable by fasteners.

2. The model construction set according to claim 1, wherein all blocks are made of square shaped pipes.

3. The model construction set according to claim 1, wherein the holes on the faces of each block are longitudinally staggered so that pairs of coaxial holes located on two opposite faces longitudinally alternate with adjacent pairs of coaxial holes located on two other opposite faces of the block, while the holes in both end parts of each block are located on all its faces in such a way that their centers lay in one plane perpendicular to the longitudinal axis of the block.

4. The model construction set according to claim 1, wherein distances between the centers of the holes located on the blocks are multiples of a specified width of an end face of the blocks that is based on a block base size.

5. The model construction set according to claim 1, wherein the fasteners are bolts, screws, nuts, washers, or studs.

6. The model construction set according to claim 1, wherein a cross-sectional size of the first and/or second auxiliary parts is determined by a cross-sectional size of the blocks the first and/or second auxiliary parts connect.

7. The model construction set according to claim 1, wherein blocks are insertable into one another to enhance strength of the blocks due to increasing block wall thickness.

8. The model construction set according to claim 1, wherein the connections in (b) through (e) are movable connections.

9. The model construction set according to claim 8, wherein the blocks are configured to act as hinge levers and the fasteners connecting the blocks are configured to act as hinge axes, for movable connections.

10. The model construction set according to claim 1, wherein the model construction set is mountable in configurations including at least two of (a) through (f).

11. The model construction set according to claim 10, wherein the connections in (b) through (e) are movable connections.

12. The model construction set according to claim 11, wherein the blocks are configured to act as hinge levers and the fasteners connecting the blocks are configured to act as hinge axes, for movable connections.

13. The model construction set according to claim 1, wherein the model construction set is mountable in configurations including at least (a) through (f).

14. The model construction set according to claim 13, wherein the connections in (b) through (e) are movable connections.

15. The model construction set according to claim 14, wherein the blocks are configured to act as hinge levers and the fasteners connecting the blocks are configured to act as hinge axes, for movable connections.

* * * * *